P. S. MARTIN.
THERMOSTAT.
APPLICATION FILED OCT. 7, 1916.
1,318,401.
Patented Oct. 14, 1919.
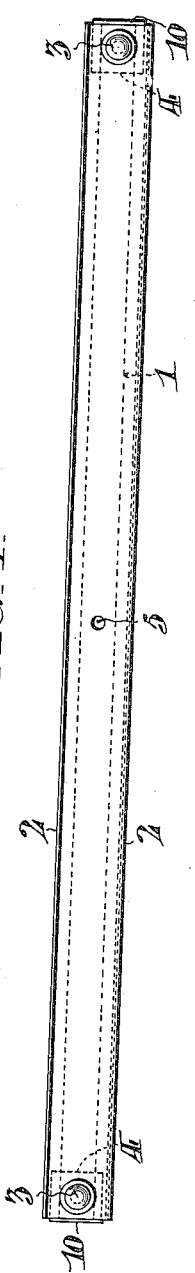
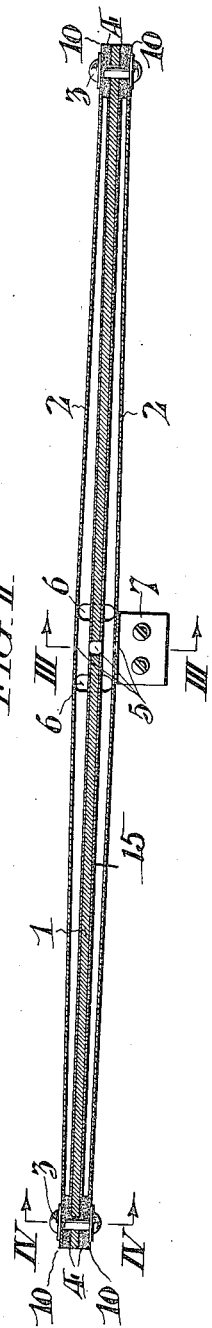
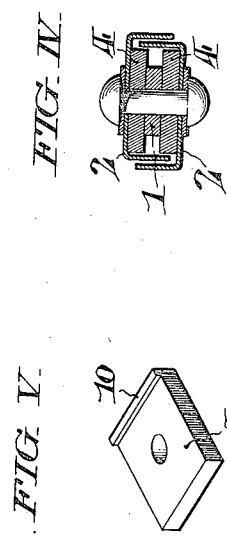
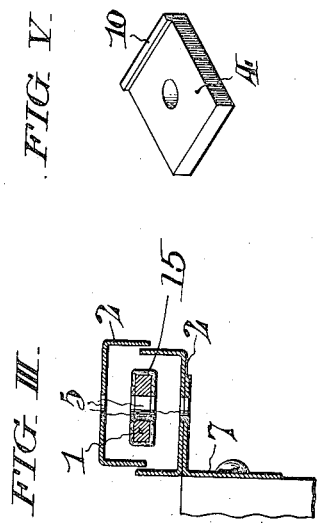
Inventor
Perry S. Martin,

UNITED STATES PATENT OFFICE.

PERRY S. MARTIN, OF HARRISONBURG, VIRGINIA.

THERMOSTAT.

1,318,401.

Specification of Letters Patent.  Patented Oct. 14, 1919.

Application filed October 7, 1916.  Serial No. 124,210.

*To all whom it may concern:*

Be it known that I, PERRY S. MARTIN, of Harrisonburg, in the county of Rockingham and State of Virginia, have invented certain new and useful Improvements in Thermostats, whereof the following is a specification, reference being had to the accompanying drawings.

My invention relates to improvements in thermostats which are particularly designed for regulating the temperature of incubators and brooders, but which may be also used for other purposes. My invention applies to that type of thermostat in which flexible metallic bars with unequal co-efficients of expansion are united at their terminals in such a way as to be capable of bowing out centrally.

In thermostats of this type, it is customary to employ a central bar having a lower coefficient of expansion than the external bars, which, therefore, bow apart as the temperature rises. For some purposes for which thermostats are used, as for example, the regulation of the temperature of incubators, it is important to accentuate the sensitiveness of the thermostat by magnifying its initial action. According to my invention I employ means coöperating with and comprising the essential outwardly exposed portions of the external bars, whereby the central bar is normally surrounded and inclosed out of contact with the main body of the atmosphere about the thermostat. Such coöperating means can, indeed, be structually embodied in the external bar members themselves, by employing for the external bars channel bars having their flanges turned toward and overlapping each other, so as to almost completely inclose the central bar. By reason of this construction when the temperature of the atmosphere surrounding the thermostat rises it affects first the external bars which momentarily expand to a greater degree in relation to the central bar than will be the case when the latter bar has become heated to the same temperature. During this period the movement of the thermostat is temporarily magnified, until a readjustment occurs as the central bar acquires the same temperature as the external bars. Such action renders the thermostat more acutely sensitive of temperature changes, and enables the temperature of an incubator to be more accurately regulated.

In the accompanying drawings, Figure I, is a plan view and Fig. II, a sectional view of a single unit of a thermostat constructed according to my invention.

Fig. III, is a second section along the line III, III, of Fig. II,

Fig. IV, is a similar section along the line IV, IV, of Fig. II, and

Fig. V, is a perspective view of one of the spacing pieces interposed between the expansion elements at the ends of the thermostat.

It will be understood that the unit shown in the drawings and as I am about to describe it, may be indefinitely multiplied with corresponding multiplication of the amplitude of movement accomplished by the thermostat.

The central bar 1, is of metal having a comparatively low coefficient of expansion, say steel. The external bars 2, 2, are formed of another metal having a higher coefficient of expansion, say zinc.

The external bars 2, 2, are channeled as best seen in Figs. III, and IV, and turned with their flanges facing each other and overlapping, as shown in the figures. The bars are riveted together at their ends, as shown at 3, 3, with interposition of suitable filler pieces 4, 4.

As shown in Fig. V, these filler pieces are provided with lateral flanges 10, which serve as abutments for the outer expansion elements, when the device is assembled according to the illustration of Figs. I, and II. As hereinbefore mentioned, these outer elements are of a comparatively soft metal, and the flanged filler pieces are therefore further functional in relieving the strains about the uniting rivets 3, thereby strengthening these regions against rupture under conditions of abnormal expansion strains.

The sensitiveness of the thermostat is increased if the filler pieces are of heat insulating material or if the central bar is inclosed in a layer of insulating material, as shown at 15, in the drawings. The bars are pierced centrally as shown at 5, and the external bars are additionally notched near the center with transverse slots 6, 6, to increase the ease with which they may be bowed.

A convenient method of mounting the thermostat is to attach the lower bar to a bracket 7, as shown in Fig. III. Other couples may be placed on top of this and a regulating rod may pass freely through the central apertures 5, of the series. The head of this rod resting upon the top of the series will, therefore, move upwardly with relation to the bracket 7, as the series expands. All this is well understood in the construction of thermostats in this general type, as also many other methods of mounting and assemblage by which they may be utilized.

The length of the bars is such that at lower temperatures they lie closely together, the channels of the external bars inclosing the central bar as best seen in Fig. IV, the overlapping flanges slipping over each other. It will be noted that the arrangement of these flanges is alternate, owing to the fact that each external bar is of the same width. This is a better construction than the one in which one narrower channel bar is inclosed or nested within a broader channel bar, whereby the thermostat is unduly weakened, since its maximum strength is that of its narrowest bar.

In operation as the temperature increases, the external bars expand, correspondingly bowing apart the central portion. Owing to the more or less complete inclosure of the central bar by the external bars a rise in temperature affects the external bars more rapidly than the central bars, thus producing a temporary exaggeration of the motion of the thermostat which is subsequently compensated or adjusted as the temperature of the central bar is equalized with the others.

This momentary exaggeration of its action under a rise in temperature is a useful feature of my invention, rendering the device more sensitive to changes of temperatures and admitting of more accurate control of the temperature of an incubator in connection with which the thermostat may be used.

Having thus described my invention, I claim:

1. In a thermostat, the combination of a central bar having a relatively low coefficient of expansion; channel bars having a relatively high coefficient of expansion mounted one above and one below said central bar and attached thereto at each end, said channel bars being mounted with their flanges facing each other and overlapping so as to normally surround the central bar.

2. In a thermostat, the combination of a centrally mounted bar having a relatively low coefficient of expansion; channel bars having a relatively high coefficient of expansion mounted one above and one below said centrally mounted bar and attached thereto at each end; and heat insulating means interposed between said channel bars and said centrally mounted bar at the points of attachment, said channel bars being mounted with their flanges facing each other and overlapping so as to normally surround the central bar.

3. In a thermostat, the combination of a central bar having a relatively low coefficient of expansion; two channel bars of equal width having a relatively high coefficient of expansion attached to the central bar at its ends and mounted one above and one below said central bar with their flanges facing each other and overlapping in alternation, whereby the central bar is normally wholly surrounded thereby, so that the surrounding atmosphere communicates its variations of temperature first to the channel bars, and only later to the central bar.

4. In a thermostat, the combination of a central bar having a relatively low coefficient of expansion, and means, comprising bars having a relatively high coefficient of expansion mounted and exposed one above and one below said central bar and attached thereto at their ends, normally surrounding and inclosing said central bar, so that the surrounding atmosphere communicates its variations of temperature first to the outer bars, and only later to the central bar.

In testimony whereof, I have hereunto signed my name, at Philadelphia, Pennsylvania, this twenty-eighth day of September, 1916.

PERRY S. MARTIN.

Witnesses:
JAMES H. BELL,
E. L. FULLERTON.